(12) United States Patent
Knoch

(10) Patent No.: US 8,387,770 B2
(45) Date of Patent: Mar. 5, 2013

(54) CHARGING TELESCOPE FOR CHARGING COKE OVENS

(75) Inventor: Ralf Knoch, Gelsenkirchen (DE)

(73) Assignee: ThyssenKrupp Uhde GmbH, Dortmund (DE)

( * ) Notice: Subject to any disclaimer, the term of this patent is extended or adjusted under 35 U.S.C. 154(b) by 64 days.

(21) Appl. No.: 12/733,639

(22) PCT Filed: Sep. 4, 2008

(86) PCT No.: PCT/EP2008/007220
§ 371 (c)(1),
(2), (4) Date: Mar. 23, 2010

(87) PCT Pub. No.: WO2009/033600
PCT Pub. Date: Mar. 19, 2009

(65) Prior Publication Data
US 2010/0200359 A1    Aug. 12, 2010

(30) Foreign Application Priority Data
Sep. 15, 2007 (DE) .......................... 10 2007 044 181

(51) Int. Cl.
*C10B 31/02* (2006.01)
*B65G 11/14* (2006.01)
(52) U.S. Cl. ........................................ 193/30; 193/25 C
(58) Field of Classification Search ..................... 193/30
See application file for complete search history.

(56) References Cited

U.S. PATENT DOCUMENTS 5,154,271 A * 10/1992 Binzen .............................. 193/30
5,384,015 A *  1/1995 Schroter et al. ................ 202/251
5,882,484 A *  3/1999 Pyy ................................. 202/262

FOREIGN PATENT DOCUMENTS

| DE | 25 59 390  |  9/1976 |
| DE | 199 64 274 | 11/2005 |
| EP | 0 454 577  | 10/1991 |
| EP | 1 293 552  |  3/2003 |

OTHER PUBLICATIONS

Piduch, H. G. et al., "Influence of latest pollution control acts on design and automation of modern coke-oven machines," Iron and Steel Engineer, Aise Steel Technology, Aise, Pittsburgh, PA, USA, vol. 71, No. 10, Oct. 1, 1994, pp. 18-22. XP-000469629 (ISR). International Search Report.

* cited by examiner

*Primary Examiner* — Kavel Singh
(74) *Attorney, Agent, or Firm* — Collard & Roe, P.C.

(57) ABSTRACT

The invention relates to a charging telescope for charging coke ovens, having a vertically oriented inlet funnel and a telescope lower part which is suspended with hanging elements on a vertically adjustable lifting device. A tubular intermediate part is arranged between the inlet funnel and the telescope lower part, which intermediate part is suspended in a movable manner on hanging elements and surrounds the outlet cross section of the inlet funnel with enough free space to allow lateral compensating movements. The intermediate part has an annular flange which is sealed on an annular face of the inlet funnel. The telescope lower part also encloses the jacket of the tubular intermediate part.

7 Claims, 3 Drawing Sheets

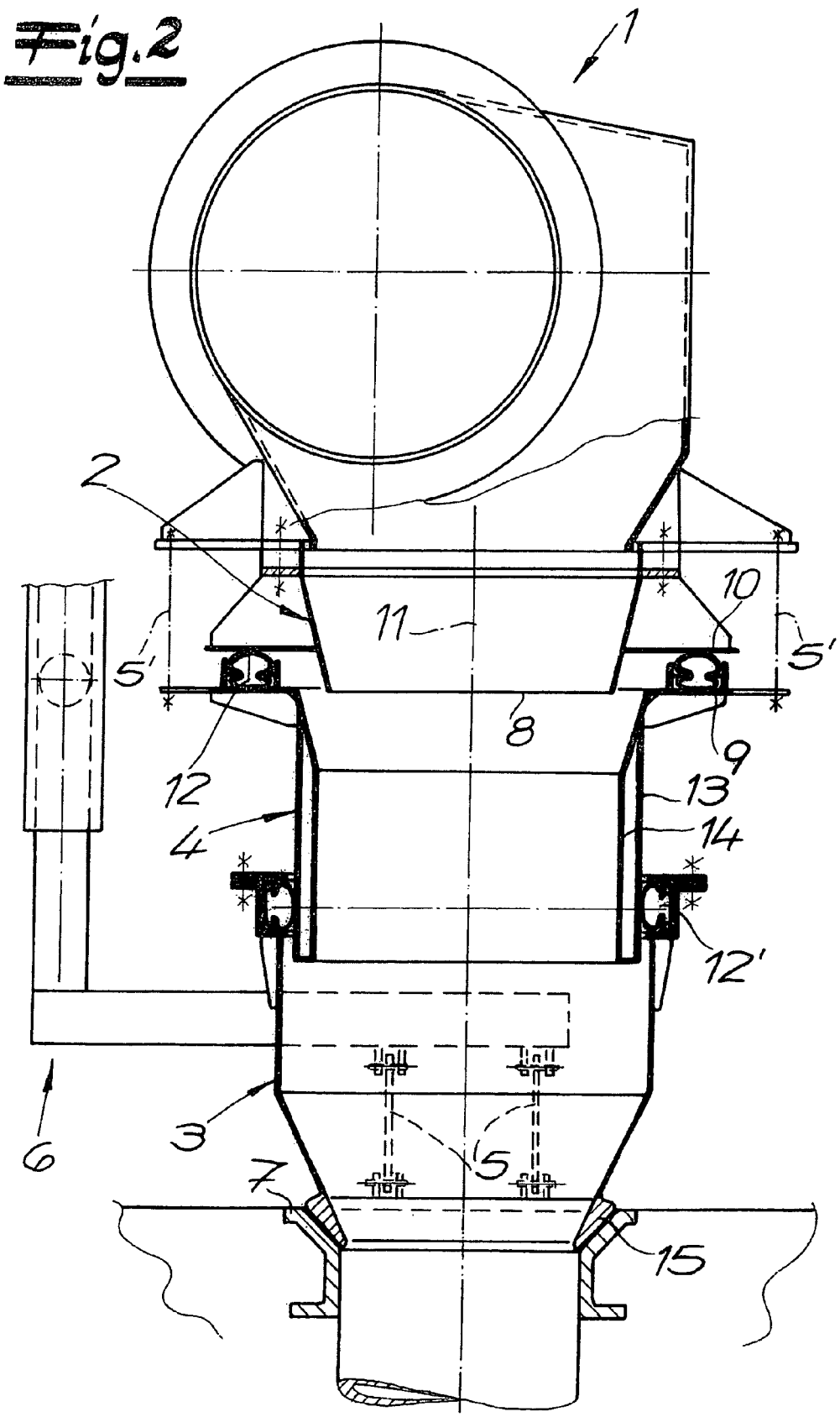

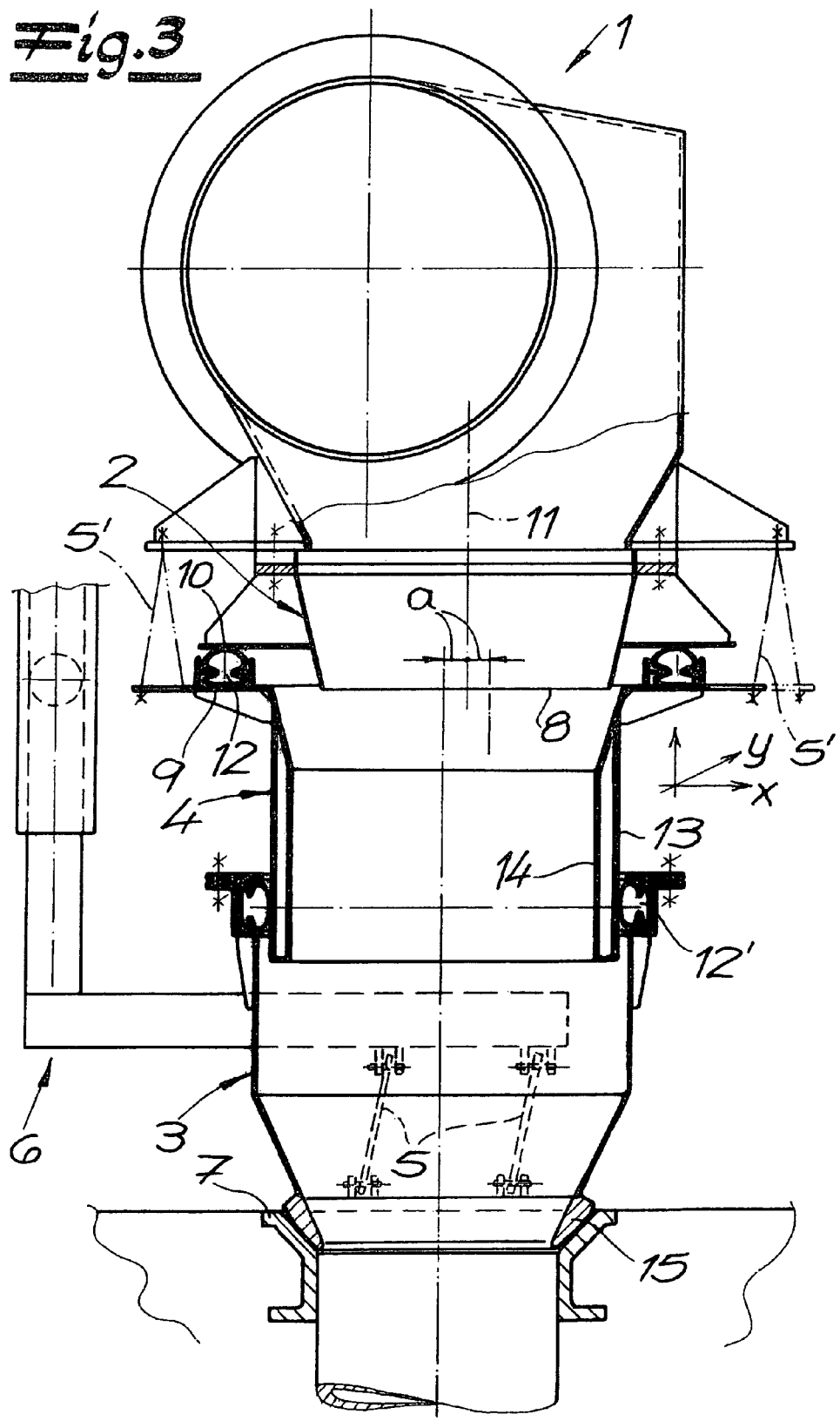

CHARGING TELESCOPE FOR CHARGING COKE OVENS

CROSS REFERENCE TO RELATED APPLICATIONS

Figure 1:
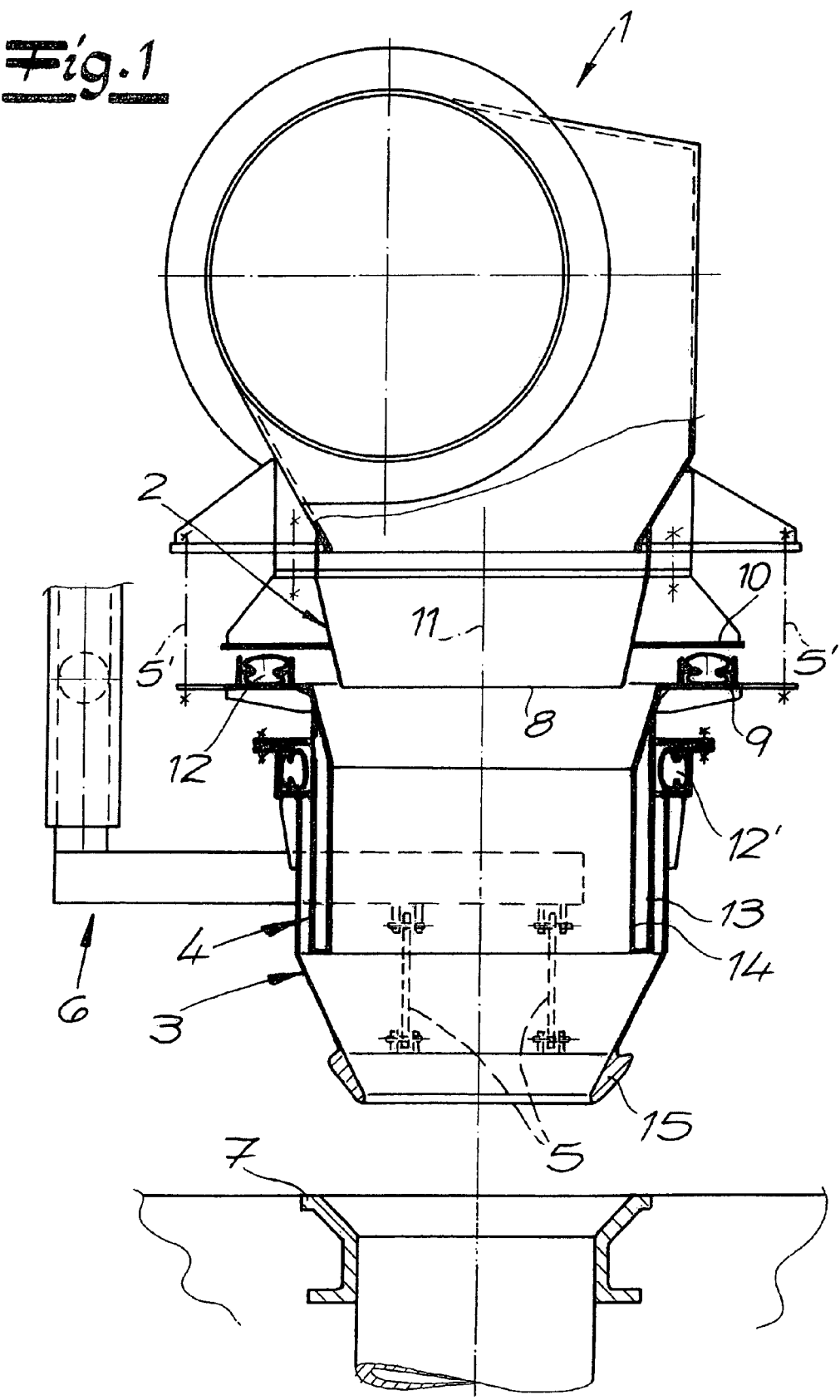

This application is the National Stage of PCT/EP2008/007220 filed on Sep. 4, 2008, which claims priority under 35 U.S.C. §119 of German Application No. 10 2007 044 181.0 filed on Sep. 15, 2007. The international application under PCT article 21(2) was not published in English.

The invention relates to a charging telescope for charging coke ovens, having a vertically oriented inlet funnel and a telescope lower part which is suspended with hanging elements on a vertically adjustable lifting device. A charging telescope with the described features is disclosed for example in DE 199 64 274 B4.

In a modern coking plant the coal charge is introduced into the oven chambers of a coke oven with the aid of charging telescopes on the coal charging wagons. The charging telescopes have a multi-part configuration and sealing arrangements in the dividing regions and in the dipping region, which sealing arrangements are supposed to prevent emissions escaping during the charging process.

Furthermore, charging telescopes are known which have compensators consisting of steel or textiles (EP 1 293 552 A). The compensators allow telescope parts to be inclined in order to adapt the telescope axis to the position of the charging opening of an oven chamber, and further ensure the tightness of the charging telescope.

During operation of the charging telescope, there are inclined positions of the parts, which are movable with respect to each other, where the axis of the inlet funnel and the axis of the charging opening in the oven chamber are not aligned. Compensators are subjected to considerable stresses in the process, especially as carbon deposits and high temperatures must be taken into account. In the event of an inclined position, considerable forces can act on the movable parts of the charging telescope as a result of constraint, which forces can in the extreme case lead to deformation of their connection regions. Also to be taken into account is the fact that sealing rings and, cones become warped quickly owing to the high temperatures, and the arrangement of the relatively movable parts with respect to each other changes continuously during operation as a result of deformation. In the case of multi-part charging telescopes without compensators, between whose movable parts seals are provided, an inclined position of the parts can also have a detrimental effect on the sealing action. The lifetime of the charging telescopes is unsatisfactory. The charging telescopes must be replaced and repaired after a relatively short operating time.

Against this background, the invention is based on the object of specifying a charging telescope with which an axis mismatch between the axis of the inlet funnel and the charging opening in the oven chamber of a coke oven can be compensated without the movable parts of the charging telescope being subjected to excessive stress by this.

The object is achieved according to the invention by a charging telescope according to Claim 1. According to the invention, a tubular intermediate part is arranged between the inlet funnel and the telescope lower part, which intermediate part is suspended in a movable manner on hanging elements and surrounds the outlet cross section of the inlet funnel with enough free space to allow lateral compensating movements. Hanging rods, chains, cables and the like can be used as hanging elements. The intermediate part has an annular flange which is sealed on an annular face of the inlet funnel. The telescope lower part also encloses the jacket of the tubular intermediate part.

When the telescope lower part is lowered into the charging opening of a coke oven, which opening is not aligned with the axis of the inlet funnel, the telescope lower part is displaced in the X and Y directions in accordance with the axis mismatch during adaptation to the actual position of the charging opening, but without assuming an inclined position. This is ensured by the hanging suspension of the telescope lower part on the associated lifting device. The telescope lower part remains vertical and perpendicular to the roof of the coke oven. At the same time, the telescope lower part moves the likewise hangingly suspended and horizontally freely movable intermediate part in the X and Y directions. The intermediate part also remains likewise vertical and perpendicular to the oven roof during this lateral movement. The configuration according to the invention of the charging telescope means an inclined position of the telescope components can be avoided. During the process of lowering into the charging hole frame and adapting to the actual position of the charging hole in the oven roof, no internal constraint forces can occur between the parts of the charging telescope, since the hanging suspension of both the telescope lower part and the intermediate part means that all the parts of the charging telescope execute lateral movements while maintaining a perpendicular alignment. The intermediate part configured according to the invention further allows sufficiently great positioning movements of the telescope lower part in the vertical direction. In contrast to compensators, the vertical positioning distance is not subject to any constructively induced restrictions.

The telescope lower part and the intermediate part are in each case suspended on at least three hanging elements, preferably hanging rods. Suspension is preferably on four or more hanging rods. The hanging elements for suspending the intermediate part are expediently connected to the upper end of the intermediate part, preferably on the outer circumference of the flange. The annular flange of the intermediate part and the associated annular face of the inlet funnel preferably extend in an essentially horizontal direction.

A seal is expediently arranged between the flange of the intermediate part and the associated annular face of the inlet funnel, which seal is preferably configured as a hose or membrane. The interior of the sealing hose or a space enclosed by the membrane is connected to a pressure source. During working movements of the charging telescope, the seal is relieved of pressure so that the annular flange can move freely relative to the associated annular face of the inlet funnel without any constraint. After the charging telescope has been lowered onto the charging opening in the oven roof and has reached its end position, the seal is activated, that is, pressurised air or another pressure medium is applied to it. The application of pressure causes the seal to bulge outwards and press against the faces of the inlet funnel and of the intermediate part, which faces are associated with each other, as a result of which optimum tightness is ensured during the charging process.

The telescope lower part is preferably also sealed with a seal against the tubular jacket of the intermediate part, with it being possible for the seal to be configured likewise as a hose or membrane to which pressure from a pressure source can be applied. During a downward or upward movement of the telescope lower part, the seal is relieved of pressure. For the charging process, pressurised air or a pressure medium is applied to the seal, which securely seals the gap between the telescope lower part and the outside of the intermediate part.

The above-described seals have a heat-resistant configuration and are installed in an easily removable manner. According to a preferred embodiment of the invention, the seals are arranged in chambers whose walls can be configured in such a manner that the seals are protected from excessive temperature and dust deposits. The temperature stresses of a seal arranged between the telescope lower part and the intermediate part can be further reduced by the jacket of the intermediate part, which is surrounded by the telescope lower part, being provided with heat insulation at least over a length which corresponds to the vertical positioning distance of the telescope lower part. The jacket of the intermediate part is preferably configured as a heat-insulated, double-walled component which has a cylindrical outer jacket and an inner jacket which widens conically towards the upper end.

The telescope lower part has a cylindrical section and an outlet cone which connects at the bottom, in a manner known per se. A sealing element for sealing at the charging hole frame of a coke oven is arranged according to the invention at the free end of the outlet cone. A sealing arrangement for bearing against the jacket of the intermediate part is further provided at the upper end of the cylindrical section.

The invention is explained below using a drawing, which shows just one exemplary embodiment.

FIGS. 1 to 3 show in each case the longitudinal section through a charging telescope according to the invention in various functional positions.

The charging telescope shown in the figures is fastened to a discharge device 1 on the underside of a coal charging wagon (not shown) and is used to transfer a coal charge from the discharge device 1 into the oven chambers of a coke oven in an emission-free manner. The basic construction of the charging telescope consists of an inlet funnel 2, which is connected to the discharge device 1, a telescope lower part 3 and a tubular intermediate part 4, which is arranged between the inlet funnel 2 and the telescope lower part 3. The telescope lower part 3 is suspended with hanging elements 5, preferably hanging rods, on a vertically adjustable lifting device 6 and can be lowered with an positioning movement of the lifting device 6 onto a charging hole frame 7 in the oven roof of the coke oven. The charging hole frame 7 forms an opening in the oven roof.

The tubular intermediate part 4 of the charging telescope is likewise suspended in a movable manner on hanging elements 5', for example hanging rods, and surrounds the outlet cross section 8 of the inlet funnel 2 with enough free space to allow lateral compensating movements. The intermediate part 4 has an annular flange 9 which is sealed against an annular face 10 of the inlet funnel. The annular flange 9 and the associated annular face 10 of the inlet funnel extend in an essentially horizontal direction. The hanging elements 5' for suspending the intermediate part 4 are connected to the upper end of the intermediate part, in the exemplary embodiment on the outer circumference of the flange 9. The hangingly suspended telescope lower part 3 encloses the jacket of the tubular intermediate part 4 and is likewise sealed with respect to the jacket.

The way the charging telescope operates becomes clear from a comparison of FIGS. 1 and 3. FIG. 1 shows the charging telescope in the raised rest state. In order to fill an oven chamber, the telescope lower part 3 is lowered into the position shown in FIG. 2. Whereas the charging opening in the oven roof is aligned with the axis 11 of the inlet funnel 2 in the operating state shown in FIG. 2, FIG. 3 shows the operating state in which a lateral mismatch a in the X and/or Y direction is present between the axis 11 of the inlet funnel and the charging opening. It is clear from a comparison of FIGS. 2 and 3 that all the movable parts 3, 4 of the charging telescope are still oriented perpendicularly even when a lateral mismatch a in the X and/or Y direction is present between the axis 11 of the inlet funnel and the axis of the charging opening. When the telescope lower part 3 is lowered into the charging hole frame 7, the telescope lower part 3 is displaced in the X and/or Y direction in accordance with the mismatch a during adaptation to the actual position of the charging hole frame 7, without assuming an inclined position. This is reliably avoided as a result of the movable suspension on hanging elements 5. The telescope lower part 3 remains vertical and perpendicular with respect to the oven roof. At the same time, the telescope lower part 3 moves the likewise hangingly suspended and horizontally freely movable intermediate part 4 laterally in the X and/or Y direction. The intermediate part 4 remains likewise vertical and perpendicular with respect to the oven roof during this lateral movement owing to its hanging suspension. The arrangement according to the invention reliably avoids inclined positions of the telescope components 3, 4 and prevents constraints in the charging telescope during the process of lowering into the charging hole frame and the lateral adaptations to the actual position of the charging hole frame 7.

Seals 12 are arranged between the movable parts 3, 4 of the charging telescope. A first seal 12 is situated between the flange 9 of the intermediate part and the associated annular face 10 of the inlet funnel. The telescope lower part 3 is further sealed with a seal 12 against the tubular jacket of the intermediate part 4. The seals 12, 12' are configured as hoses or membranes, with the interior of the hose or a space enclosed by the membrane being connected to a pressure source (not shown). The seals 12, 12' are activated by pressure being applied to them by pressurised air or another pressure medium and bulge outwards, whereby they bridge the gap between the faces to be sealed. This state is shown in FIGS. 2 and 3. If the charging telescope is to be retracted or lowered, the seals 12, 12' are deactivated, that is, relieved of pressure. This state is shown in FIG. 1. FIG. 1 shows that the seals 12, 12' do not bear against the face to be sealed in each case, so that the telescope parts 3, 4 can move completely freely with respect to each other during their working movements, so that internal tension and constraint forces cannot occur, and the seals are not subjected to wear as a result of the movements of the parts.

The seals 12, 12' are arranged in chambers, which not only ensure a proper positioning of the seals, but also protect the seals from excessive dust deposits or heat.

The jacket of the intermediate part 4 is configured as a heat-insulated, double-walled component which has a cylindrical outer jacket 13 and an inner jacket 14 which widens conically towards the upper end. As a result of the insulation effect of the double-walled component, the effect of the temperature on the seal 12' of the telescope lower part 3 is considerably reduced.

The telescope lower part 3 has a cylindrical section and an outlet cone which connects on the bottom. A sealing element 15 for sealing at the charging hole frame is arranged at the free end of the outlet cone. The sealing arrangement with the described seal 12 for bearing against the jacket of the intermediate part 4 is situated at the upper end of the cylindrical section.

The charging telescope according to the invention is characterised owing to its construction by a high level of operational reliability and makes it possible to compensate large positional disparities between the axis 11 of the inlet funnel 2 and the charging opening in the oven roof of the coke oven.

Maintenance and cleaning work can be kept to a minimum with the arrangement according to the invention.

The invention claimed is:

1. A charging telescope for charging a coke oven, the charging telescope having an inlet funnel vertically oriented and a telescope lower part, the telescope lower part being suspended with first hanging elements on an adjustable lifting device,
   wherein a tubular intermediate part is arranged between the inlet funnel and the telescope lower part, which tubular intermediate part is suspended in a movable manner on second hanging elements and surrounds the outlet cross section of the inlet funnel with enough free space to allow lateral compensating movements,
   wherein the tubular intermediate part has an annular flange sealed on an annular face of the inlet funnel, wherein the annular flange and the associated annular face of the inlet funnel extend in an essentially horizontal direction, and
   wherein the telescope lower part encloses a jacket of the tubular intermediate part,
   wherein a seal is arranged between the annular flange and the annular face of the inlet funnel,
   wherein the seal is configured as a hose or a membrane and wherein the interior of the hose or a space enclosed by the membrane is connected to a pressure source,
   wherein a pressure can be applied from the pressure source to the seal and
   wherein the seal is relieved of pressure during a downward or upward movement of the telescope lower part.

2. The charging telescope according to claim 1, wherein the second hanging elements are connected to the upper end of the intermediate part.

3. The charging telescope according to claim 1, wherein the jacket of the tubular intermediate part is tubular, and
   wherein the telescope lower part is sealed with a seal against the jacket of the intermediate part.

4. The charging telescope according to claim 1, wherein the seal is arranged in chambers.

5. The charging telescope according to claim 1, wherein the jacket of the intermediate part has a cylindrical configuration and is provided with heat insulation at least over a length corresponding to the vertical positioning distance of the telescope lower part.

6. The charging telescope according to claim 5, wherein the jacket of the intermediate part is configured as a heat-insulated, double-walled component comprising a cylindrical outer jacket and an inner jacket, the inner jacket widening conically towards the upper end.

7. The charging telescope according to claim 1, wherein the telescope lower part has a cylindrical section and an outlet cone which connects at the bottom,
   wherein a sealing element for sealing on the charging hole frame of a coke oven is arranged at the free end of the outlet cone, and
   wherein a sealing arrangement for bearing against the jacket of the intermediate part is provided at the upper end of the cylindrical section.

* * * * *

UNITED STATES PATENT AND TRADEMARK OFFICE
CERTIFICATE OF CORRECTION

PATENT NO. : 8,387,770 B2  Page 1 of 1
APPLICATION NO. : 12/733639
DATED : March 5, 2013
INVENTOR(S) : Ralf Knoch It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 72 days.

Signed and Sealed this
First Day of September, 2015

Michelle K. Lee
*Director of the United States Patent and Trademark Office*